(12) United States Patent
McCann (10) Patent No.: US 11,897,391 B1
(45) Date of Patent: Feb. 13, 2024

(54) SYSTEMS AND METHODS FOR MANAGING INTERIOR LIGHT ILLUMINATION IN A VEHICLE

(71) Applicant: GM GLOBAL TECHNOLOGY OPERATIONS LLC, Detroit, MI (US)

(72) Inventor: Morgan Lee McCann, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/298,471

(22) Filed: Apr. 11, 2023

(51) Int. Cl.
| | |
|---|---|
| *B60Q 3/80* | (2017.01) |
| *G06V 20/59* | (2022.01) |
| *B60Q 3/20* | (2017.01) |
| *G06V 40/18* | (2022.01) |

(52) U.S. Cl.
CPC .............. *B60Q 3/80* (2017.02); *B60Q 3/20* (2017.02); *G06V 20/59* (2022.01); *G06V 40/18* (2022.01); *B60Q 2500/30* (2022.05)

(58) Field of Classification Search
None
See application file for complete search history.

(56) References Cited

U.S. PATENT DOCUMENTS

| | | | | |
|---|---|---|---|---|
| 2021/0261050 | A1* | 8/2021 | Sobhany | B60Q 3/80 |
| 2021/0365702 | A1* | 11/2021 | Edwards | G06V 10/60 |
| 2021/0397863 | A1* | 12/2021 | Kose Cihangir | G06V 40/171 |
| 2022/0189308 | A1* | 6/2022 | Stent | G08G 1/005 |
| 2022/0242433 | A1* | 8/2022 | Hecht | B60W 50/14 |
| 2022/0324328 | A1* | 10/2022 | Kato | G06V 20/59 |
| 2022/0346207 | A1* | 10/2022 | Diamond | G01J 1/4204 |
| 2022/0413785 | A1* | 12/2022 | Lambert | G01S 19/01 |

\* cited by examiner

*Primary Examiner* — Wilson Lee
(74) *Attorney, Agent, or Firm* — Lorenz & Kopf LLP (57) ABSTRACT

Methods and systems are provided for managing interior light illumination in a vehicle. Gaze data associated with an occupant of the vehicle is received from at least one gaze data sensor of the vehicle. The gaze direction of the occupant is determined based on the gaze data. A first light zone is identified from a plurality of light zones in the vehicle where the first light zone is in a line of sight associated with the gaze direction of the occupant. Each of the plurality of light zones includes at least one interior light. An illumination intensity level of the at least one interior light in the first light zone is adjusted from a first illumination intensity level to a second illumination intensity level, where the second illumination intensity level is greater than the first illumination intensity level.

20 Claims, 7 Drawing Sheets

SYSTEMS AND METHODS FOR MANAGING INTERIOR LIGHT ILLUMINATION IN A VEHICLE

INTRODUCTION

The technical field generally relates to vehicles, and more particularly relates to systems and methods for managing interior light illumination in a vehicle.

Many of the interior lights in a vehicle are maintained at a constant illumination intensity level during evening and night driving. Examples of such interior lights include, but are not limited to, instrument cluster lights, radio lights, heating ventilation air conditioning (HVAC) lights, and park-reverse-neutral-drive-low (PRNDL) lights. Maintaining these interior lights at a constant illumination intensity level may cause eye strain for the driver, potentially impact vehicle safety, may impact the lifespan of the light emitting diodes (LED) used in the interior lights and/or may impact a range of an electric vehicle (EV).

Some interior lights are maintained in an off condition. If the driver, co-driver, or a passenger wishes to turn on such interior lights, the driver, co-driver, or passenger has to manually activate a switch to turn on the interior lights. Examples of such interior lights include, but are not limited to, footwell lights, door lights, and passenger screens. Searching for manual light switches may distract a driver or a co-driver while driving and impact vehicle safety.

Accordingly, it is desirable to provide improved methods and systems to automatically manage the interior light illumination in a vehicle. Furthermore, other desirable features and characteristics will become apparent from the subsequent detailed description and the appended claims, taken in conjunction with the accompanying drawings and the foregoing technical field and background.

SUMMARY

A system is provided for managing interior light illumination in a vehicle. The system includes a processor and a memory communicatively coupled to the processor. The memory includes instructions that upon execution by the processor, cause the processor to: receive gaze data associated with an occupant of the vehicle from at least one gaze data sensor of the vehicle; determine a gaze direction of the occupant based on the gaze data; identify a first light zone from a plurality of light zones in the vehicle in a line of sight associated with the gaze direction of the occupant, each of the plurality of light zones including at least one interior light; and adjust an illumination intensity level of the at least one interior light in the first light zone from a first illumination intensity level to a second illumination intensity level, the second illumination intensity level being greater than the first illumination intensity level.

In at least one embodiment, the memory includes further instructions that upon execution by the processor, cause the processor to receive the gaze data associated with the occupant from the at least one gaze data sensor, the gaze data comprising eye gaze tracking data associated with the occupant.

In at least one embodiment, the memory includes further instructions that upon execution by the processor, cause the processor to receive the eye gaze tracking data from the at least one gaze data sensor, the at least one gaze data sensor including at least one of a driver monitoring system (DMS), an interior vehicle camera (IVC), an interior cabin sensing radar (ICSR), a radar sensor, a shortwave infrared (SWIR) sensor, a longwave infrared sensor (LWIR), a red, green, and blue (RGB) sensor, and a thermal sensor.

In at least one embodiment, the memory includes further instructions that upon execution by the processor, cause the processor to: receive the gaze data associated with the occupant from the at least one gaze data sensor, wherein the at least one gaze data sensor includes at least one camera and the gaze data comprises images of head positions of the occupant received from the at least one camera; determine a vector of movement associated with a head of the occupant based on the images of the head positions; and determine the gaze direction of the occupant based on the vector of movement associated with the head of the occupant.

In at least one embodiment, the memory includes further instructions that upon execution by the processor, cause the processor to receive the gaze data associated with the occupant of the vehicle, the occupant of the vehicle being at least one of a front seat occupant, a driver, a co-driver, and a passenger.

In at least one embodiment, the memory includes further instructions that upon execution by the processor, cause the processor to identify the first light zone from the plurality of light zones, the plurality of light zones including at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

In at least one embodiment, the memory includes further instructions that upon execution by the processor, cause the processor to place the at least one interior light in the first light zone in an off position, the off position being the first illumination intensity level for the first light zone.

In at least one embodiment, the memory includes further instructions that upon execution by the processor, cause the processor to: receive an ambient light level around the vehicle from at least one ambient light sensor; determine the first illumination intensity level for the first light zone based on the ambient light level; and illuminate the at least one interior light in the first light zone in accordance with the first illumination intensity level.

In at least one embodiment, the memory includes further instructions that upon execution by the processor, cause the processor to: determine the first illumination intensity level for the first light zone based on safety regulations; and illuminate the at least one interior light in the first light zone in accordance with the first illumination intensity level.

In at least one embodiment, the memory includes further instructions that upon execution by the processor, cause the processor to maintain the second illumination intensity level of the at least one interior light in the first light zone for a pre-determined period of time following detection of a change in the gaze direction of the occupant.

In at least one embodiment, the memory includes further instructions that upon execution by the processor, cause the processor to gradually decrease the illumination intensity level of the at least one interior light in the first light zone from the second illumination intensity level to the first illumination intensity level after a pre-determined period of time following detection of a change in the gaze direction of the occupant.

A method is provided for managing interior light illumination in a vehicle. The method includes receiving gaze data associated with an occupant of the vehicle from at least one gaze data sensor of the vehicle; determining a gaze direction of the occupant based on the gaze data; identifying a first light zone from a plurality of light zones in the vehicle in a line of sight associated with the gaze direction of the occupant, each of the plurality of light zones including at least one interior light; and adjusting an illumination intensity level of the at least one interior light in the first light zone from a first illumination intensity level to a second illumination intensity level, the second illumination intensity level being greater than the first illumination intensity level.

In at least one embodiment, the method further includes receiving the gaze data associated with the occupant from the at least one gaze data sensor, wherein the at least one gaze data sensor includes at least one of a driver monitoring system (DMS), an interior vehicle camera (IVC), an interior cabin sensing radar (ICSR), a radar sensor, a shortwave infrared (SWIR) sensor, a longwave infrared sensor (LWIR), a red, green, and blue (RGB) sensor, and a thermal sensor and the gaze data comprises eye gaze tracking data associated with the occupant.

In at least one embodiment, the method further includes identifying the first light zone from the plurality of light zones, the plurality of light zones including at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

In at least one embodiment, the method further includes receiving an ambient light level around the vehicle from at least one ambient light sensor; determining the first illumination intensity level for the first light zone based on the ambient light level; and illuminating the at least one interior light in the first light zone in accordance with the first illumination intensity level.

In at least one embodiment, the method further includes gradually decreasing the illumination intensity level of the at least one interior light in the first light zone from the second illumination intensity level to the first illumination intensity level after a pre-determined period of time following detection of a change in the gaze direction of the occupant.

A vehicle including a system for managing interior light illumination is provided. The vehicle includes a processor and a memory communicatively coupled to the processor. The memory includes instructions that upon execution by the processor, cause the processor to: receive gaze data associated with an occupant of the vehicle from at least one gaze data sensor of the vehicle; determine a gaze direction of the occupant based on the gaze data; identify a first light zone from a plurality of light zones in the vehicle in a line of sight associated with the gaze direction of the occupant, each of the plurality of light zones including at least one interior light; and adjust an illumination intensity level of the at least one interior light in the first light zone from a first illumination intensity level to a second illumination intensity level, the second illumination intensity level being greater than the first illumination intensity level.

In at least one embodiment, the memory includes further instructions that upon execution by the processor, cause the processor to receive the gaze data associated with the occupant from the at least one gaze data sensor, wherein the at least one gaze data sensor includes at least one of a driver monitoring system (DMS), an interior vehicle camera (IVC), an interior cabin sensing radar (ICSR), and a radar sensor, a shortwave infrared (SWIR) sensor, a longwave infrared sensor (LWIR), a red, green, and blue (RGB) sensor, and a thermal sensor and the gaze data comprises eye gaze tracking data associated with the occupant.

In at least one embodiment, the memory includes further instructions that upon execution by the processor, cause the processor to identify the first light zone from the plurality of light zones, the plurality of light zones including at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

In at least one embodiment, the memory includes further instructions that upon execution by the processor, cause the processor to gradually decrease the illumination intensity level of the at least one interior light in the first light zone from the second illumination intensity level to the first illumination intensity level after a pre-determined period of time following detection of a change in the gaze direction of the occupant.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, at least one embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments of the present disclosure.

Figure 1:
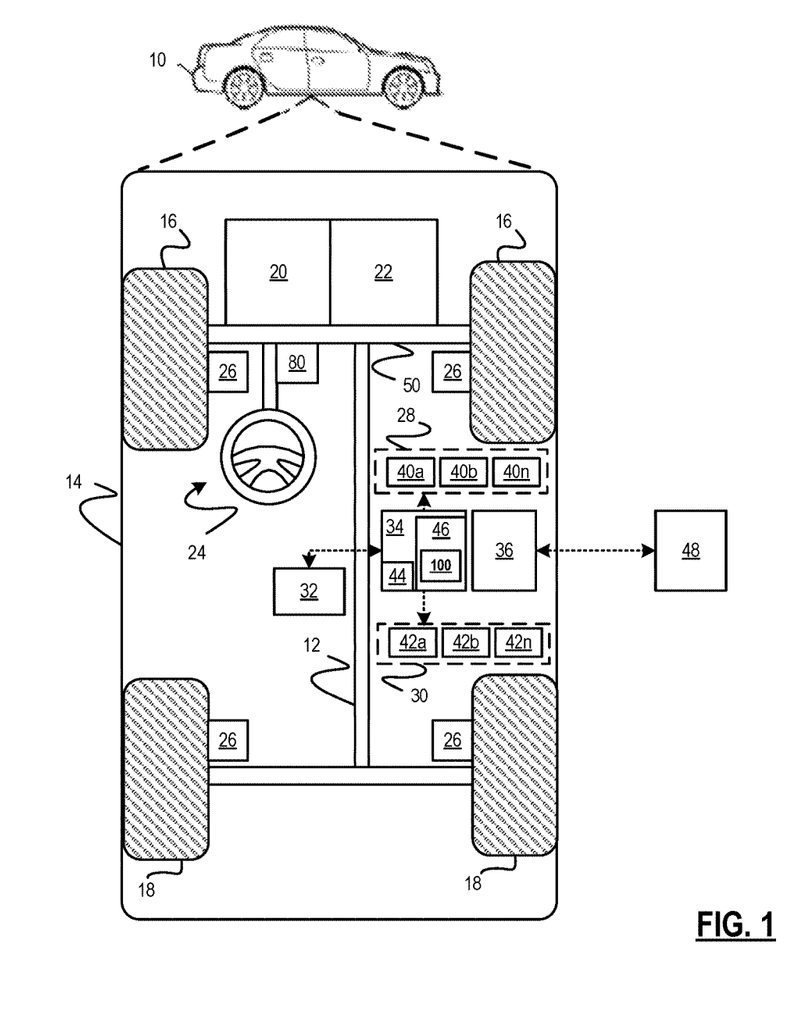
FIG. 1 is a functional block diagram illustrating a vehicle including an interior light illumination management system in accordance with at least one embodiment.

Referring to FIG. 1, a functional block diagram illustrating a vehicle 10 including an interior light illumination management system 100 in accordance with at least one embodiment is shown. The vehicle 10 generally includes a chassis 12, a body 14, front wheels 16, and rear wheels 18. The vehicle 10 is depicted in the illustrated embodiment as a passenger car, but it should be appreciated that the interior light illumination management system 100 may be included within any other vehicle including trucks, sport utility vehicles (SUVs), recreational vehicles (RVs), etc., can also be used.

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is a manually driven vehicle or a semi-autonomous vehicle. For example, in an exemplary embodiment, the vehicle 10 is a so-called Level One, Level Two, Level Three, or Level Four automation system. Level One automation means that the vehicle includes at least one driver assist system. Level Two automation means the vehicle assists the driver in various driving tasks with driver supervision. Level Three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16. While the vehicle 10 is illustrated as being a left-hand drive vehicle, in alternative embodiments, the vehicle 10 may be a right-hand drive vehicle.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, ambient light sensors, gaze detection sensors, and/or other sensors. Examples of gaze detection sensors include, but are not limited to, a driver monitoring system (DMS), an interior vehicle camera (IVC), and an interior cabin sensing radar (ICSR).

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In at least one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered). In at least one embodiment, the vehicle 10 includes a plurality of light zones. Each of the light zones includes one or more interior lights. Examples of light zones include, but are not limited to, an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

The communication system 36 is configured to wirelessly communicate information to and from other entities 48, such as but not limited to, other vehicles ("V2V" communication) infrastructure ("V2I" communication), remote systems, and/ or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in connection with the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms to control one or more aspects of the vehicle 10. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control one or more features of the vehicle 10.

In various embodiments, one or more instructions of the controller 34 are embodied in the interior light illumination management system 100 and, when executed by the processor 44, implement the methods described with respect to FIGS. 2, 3, 4, and 5.

Figure 2:
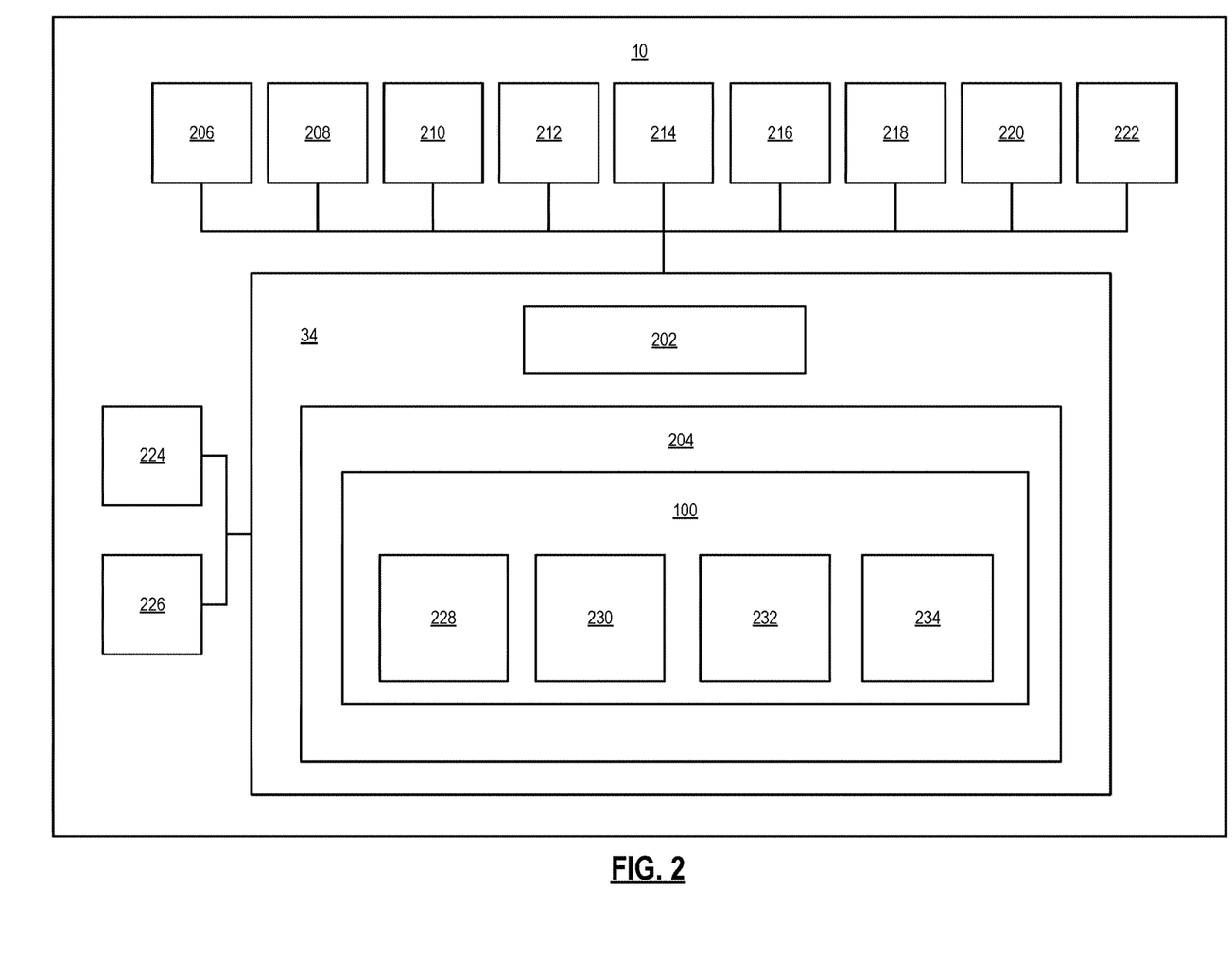
FIG. 2 is a functional block diagram illustrating a controller an interior light illumination management system in accordance with at least one embodiment.

Referring to FIG. 2, a functional block diagram illustrating a controller 34 of a vehicle 10 including an interior light illumination management system 100 in accordance with at least one embodiment is shown. The controller 34 includes at least one processor 202, and at least one memory 204. The at least one processor 202 is a programmable device that includes one or more instructions stored in or associated with the at least one memory 204. The at least one memory 204 includes instructions that the at least one processor 202 is configured to execute.

The vehicle 10 includes a plurality of light zones 206, 208, 210, 212, 214, 216, 218, 220, 222. The controller 34 is configured to be communicatively coupled to the light zones 206, 208, 210, 212, 214, 216, 218, 220, 222. Each light zone 206, 208, 210, 212, 214, 216, 218, 220, 222 includes one or more interior lights. In at least one embodiment, the plurality of light zones 206, 208, 210, 212, 214, 216, 218, 220, 222 include an instrument cluster light zone 206, a radio light zone 208, a heating air conditional and ventilation (HVAC) light zone 210, a park-reverse-neutral-drive-low (PRNDL) light zone 212, a right footwell light zone 214, a left footwell light zone 216, a right door light zone 218, a left door light zone 220, and a passenger screen light zone 222. In at least one embodiment, the PRNDL light zone 212 includes one or more of a multifunction controller and a center console.

In alternative embodiments, the vehicle 10 may include a subset of the described light zones 206, 208, 210, 212, 214, 216, 218, 220, 222. In alternative embodiments, the vehicle 10 may include additional light zones. In alternative embodiments, the light zones may be configured to include different sets of interior lights. For example, a single light zone may include both the interior lights in the radio light area and the interior lights in the HVAC area.

The controller 34 is configured to be communicatively coupled to one or more ambient light sensors 224. The ambient light sensor(s) 224 are configured to detect an ambient light level around the vehicle 10. The controller 34 is configured to be communicatively coupled to one or more gaze data sensor(s) 226. In various embodiments, the gaze data sensor(s) 226 includes one or more of a driver monitoring system (DMS), an interior vehicle camera (IVC), an interior cabin sensing radar (ICSR), a radar sensor, a short-wave infrared (SWIR) sensor, a longwave infrared sensor (LWIR), a red, green, and blue (RGB) sensor, and a thermal sensor. In various embodiments, the gaze data sensor(s) 226 includes at least one camera. Examples of cameras include, but are not limited to, optical cameras and infrared cameras.

The at least one memory 204 includes the interior light illumination management system 100. In at least one embodiment, the interior light illumination management system 100 includes a minimum illumination determiner 228, a gaze direction determiner 230, a light zone identifier 232, and a light zone illumination manager 234. The interior light illumination management system 100 may include additional components that facilitate operation of the interior light illumination management system 100. The at least one memory 204 may include other applications that facilitate operation of the controller 34. The controller 34 may include additional components that facilitate operation of the controller 34.

The minimum illumination determiner 228 is configured to determine a minimum illumination intensity level for each of the plurality of light zones 206, 208, 210, 212, 214, 216, 218, 220, 222. The minimum illumination determiner 228 is configured to periodically update the minimum illumination intensity level for the each of the plurality of light zones 206, 208, 210, 212, 214, 216, 218, 220, 222. The operation of embodiments of the minimum illumination determiner 228 will be described with respect to FIG. 3.

Figure 3:
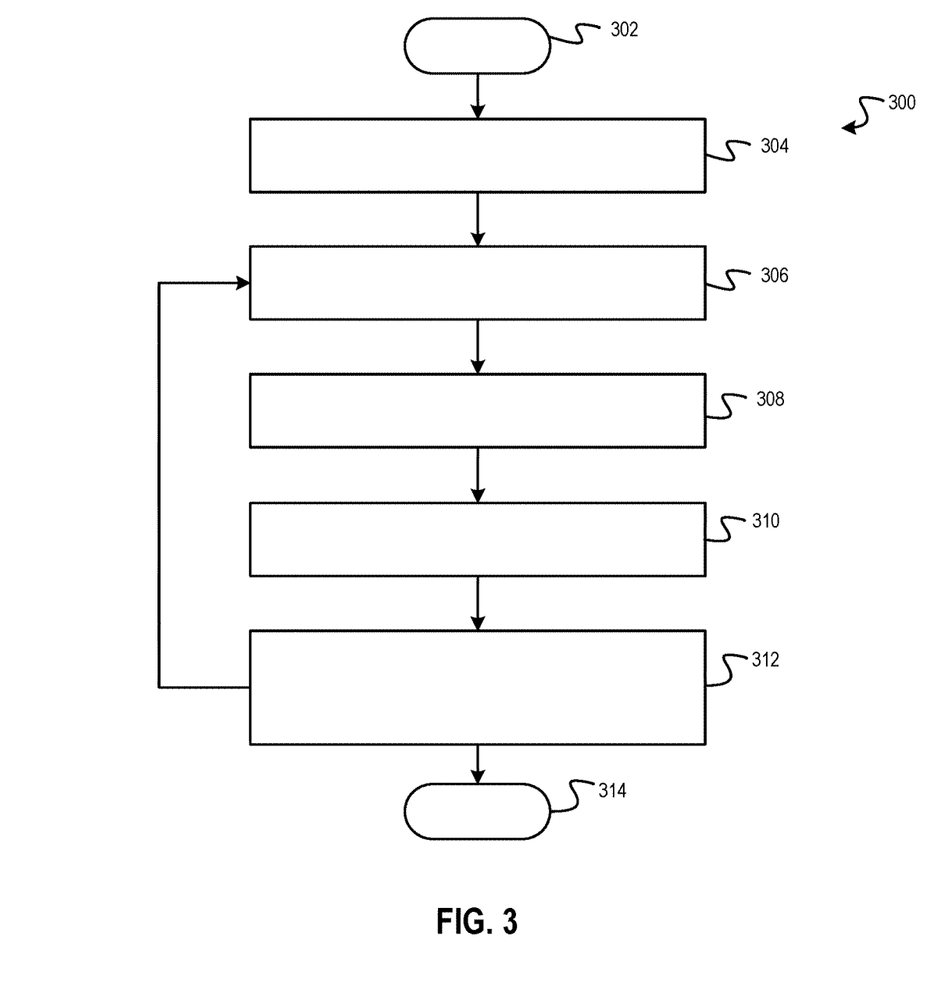
FIG. 3 is a flowchart representation of a method of determining minimum illumination intensity levels for each of a plurality of light zones in a vehicle in accordance with at least one embodiment.

FIG. 3 is a flowchart representation of a method 300 of determining a minimum illumination intensity level for each of the plurality of light zones 206, 208, 210, 212, 214, 216, 218, 220, 222 in the vehicle 10 in accordance with at least one embodiment. The method 300 will be described with reference to an exemplary implementation of the minimum illumination determiner 228. As can be appreciated in light of the disclosure, the order of operation within the method 300 is not limited to the sequential execution as illustrated in FIG. 3 but may be performed in one or more varying orders as applicable and in accordance with the present disclosure.

The method 300 begins at 302. In various embodiments, the method 300 begins when the vehicle 10 is turned on. In various embodiments, the method 300 begins when the vehicle 10 exits a daytime light mode. At 304, the minimum illumination determiner 228 identifies the light zones where the interior lights in the identified light zones will be placed in an off position. For example, the minimum illumination determiner 228 may determine that the interior lights in the right footwell light zone 214, the left footwell light zone 216, the right door light zone 218, and the left door light zone 220 will be placed in an off position. In other words, the minimum illumination determiner 228 determines that the minimum illumination intensity level for the identified light zones is no light.

At 306, the minimum illumination determiner 228 receives an ambient light level around the vehicle 10 from one or more of the ambient light sensors 224. In various embodiments, the minimum illumination determiner 228 receives an ambient light level around the exterior of the vehicle 10 from one or more of the ambient light sensors 224. At 308, the minimum illumination determiner 228 determines a minimum illumination intensity level for each of the light zones that are set at to a minimum illumination intensity level based on the ambient light level around the vehicle 10. In various embodiments, the minimum illumination determiner 228 determines a minimum illumination intensity level for the instrument cluster light zone 206, the radio light zone 208, the HVAC light zone 210, the PRNDL light zone 212, and the passenger screen light zone 222 based on the ambient light level around the vehicle 10.

For example, when the ambient light sensor(s) 224 detect a low ambient light level around the vehicle 10, the minimum illumination determiner 228 determines a low minimum illumination intensity level for the light zones compared to when the ambient light sensor(s) 224 detect a high ambient light level around the vehicle 10. Reducing the minimum illumination intensity levels of the light zones under low ambient light conditions and increasing the minimum illumination intensity levels of the light zones under high ambient light conditions may decrease eye strain on the driver, co-driver, a front seat occupant and/or a passenger. This may enable the driver and/or co-driver to see better at night and reduce the likelihood of potential collisions. In addition, adjusting the minimum illumination intensity levels of the light zones based on ambient light conditions may also reduce power consumption and increase the lifespan of the light emitting diodes (LED) used by the interior lights in the light zones. Reducing the illumination of the interior lights in the light zones to the minimum illumination intensity levels may reduce energy consumption thereby improving a range of an electric vehicle (EV).

At 310, the minimum illumination determiner 228 adjusts the minimum illumination intensity levels for the light zones where the minimum illumination intensity levels are defined by safety guidelines and/or regulations. For example, the minimum illumination intensity levels for the instrument cluster light zone and the PRNDL light zone may be governed by safety guidelines and/or regulations. If at the 308, the minimum illumination determiner 228 determined minimum illumination intensity levels for the instrument cluster light zone 206 and the PRNDL light zone 212 that fall below the safety guidelines and/or regulations, the minimum illumination determiner 228 increases the minimum illumination intensity levels for the instrument cluster light zone 206 and the PRNDL light zone 212 to comply with the safety guidelines and/or regulations.

At 312, the minimum illumination determiner 228 illuminates the interior lights in each of the plurality of light zones 206, 208, 210, 212, 214, 216, 218, 220, 222 in accordance with the determined minimum illumination intensity levels. The method 300 returns the 306 and repeats the method 300 on a periodic basis. In various embodiments, the method 300 ends at 314 when the vehicle 10 is turned off. In various embodiments, the method 300 ends at 314 when the vehicle 10 enters a daytime light mode. In certain embodiments, the ambient light sensor(s) 224 detects the ambient light level around the exterior of the vehicle 10 and the controller 34 compares the detected ambient light level to an ambient light threshold. If the controller 34 determines that the detected ambient light level is greater than the ambient light threshold, the vehicle 10 enters the daytime light mode.

Referring back to FIG. 2, in various embodiments, the gaze direction determiner 230 is configured to determine a gaze direction of one or more occupants of the vehicle 10. In various embodiments, the gaze direction determiner 230 is configured to determine a gaze direction of a driver of the vehicle 10. In various embodiments, the gaze direction determiner 230 is configured to determine a gaze direction of a co-driver of the vehicle 10. In cases, where there is a driver and a co-driver of a vehicle 10, various embodiments of the gaze direction determiner 230 are configured to determine gaze directions of both the driver and the co-driver. In various embodiments, the gaze direction determiner 230 is configured to determine a gaze direction of a front seat occupant of the vehicle 10. In various embodiments, the gaze direction determiner 230 is configured to determine a gaze direction of a passenger of the vehicle 10. Operation of embodiments of the gaze direction determiner 230 will be described with respect to FIG. 4. In at least one embodiment, the method 400 is initiated in parallel with the method 300.

Figure 4:
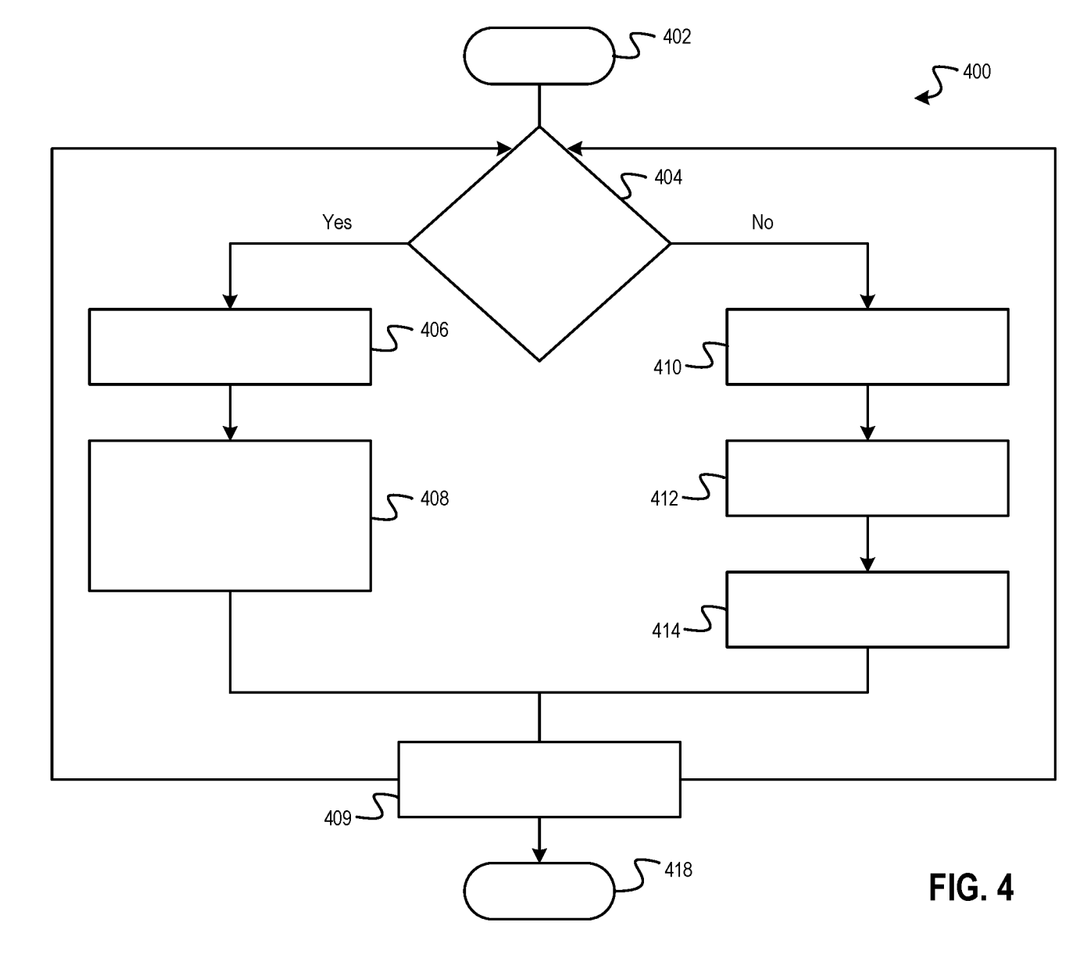
FIG. 4 is a flowchart representation of a method of determining a gaze direction of an occupant of a vehicle for association with a light zone in accordance with at least one embodiment.

FIG. 4 is a flowchart representation of a method 400 of determining a gaze direction of one or more occupants of a vehicle 10 for association with one of the plurality of light zone 206, 208, 210, 212, 214, 216, 218, 220, 222 in accordance with at least one embodiment. In various embodiments, the method 400 determines a gaze direction of a driver of a vehicle 10. In various embodiments, the method 400 determines a gaze direction of a co-driver of a vehicle 10. In cases, where there is a driver and a co-driver of a vehicle 10, various embodiments of the method 400 determines gaze directions of both the driver and the co-driver. In various embodiments, the method 400 determines a gaze direction of an occupant of a front seat of a vehicle 10. In various embodiments, the method 400 determines a gaze direction of a passenger of the vehicle 10. In various embodiments, the method 400 determines a gaze direction of one or more of a driver, co-driver, front seat occupant, and passenger.

The method 400 will be described with reference to an example implementation of the gaze direction determiner

230. As can be appreciated in light of the disclosure, the order of operation within the method 400 is not limited to the sequential execution as illustrated in FIG. 4 but may be performed in one or more varying orders as applicable and in accordance with the present disclosure.

The method 400 begins at 402. In at least one embodiment, the method 400 begins when the vehicle 10 is turned on. In at least one embodiment, the method 400 begins when the vehicle exits a daytime light mode. At 404, the gaze direction determiner 230 determines whether the gaze data sensor 226 includes one or more eye gaze tracking sensors. In various embodiments, the eye gaze tracking sensors includes one or more of a driver monitoring system (DMS), an interior vehicle camera (IVC), and an interior cabin sensing radar (ICSR). While a number of different eye gaze tracking sensors have been described, alternative embodiments may include other types of eye gaze tracking sensors.

If the gaze direction determiner 230 determines that the gaze data sensor(s) 226 includes eye gaze tracking sensor(s) at 404, the gaze direction determiner 230 receives eye gaze tracking data for one or more occupants of the vehicle 10 from the eye gaze tracking sensor(s) at 406. In various embodiments, the gaze direction determiner 230 receives eye gaze tracking data for a driver of the vehicle 10. In various embodiments, the gaze direction determiner 230 receives eye gaze tracking data for a co-driver of the vehicle 10. In various embodiments, the gaze direction determiner 230 receives eye gaze tracking data for a driver and a co-driver. In various embodiments, the gaze direction determiner 230 receives eye gaze tracking data for a front seat occupant. In various embodiments, the gaze direction determiner 230 receives eye gaze tracking data for a passenger. In various embodiments, the gaze direction determiner 230 receives eye gaze tracking data for one or more of a driver, a co-driver, a front seat occupant, and a passenger.

At 408, the gaze direction determiner 230 determines the gaze direction of the one or more occupants of the vehicle 10 based on the eye gaze tracking data for each of the one or more occupants. In various embodiments, the gaze direction determiner 230 determines the gaze direction for a driver of the vehicle 10 based on the eye gaze tracking data associated with the driver. In various embodiments, the gaze direction determiner 230 determines the gaze direction for a co-driver of the vehicle 10 based on the eye gaze tracking data associated with the co-driver. In various embodiments, the gaze direction determiner 230 determines the gaze direction for a driver and a co-driver of the vehicle 10 based on the eye gaze tracking data associated with the driver and co-driver, respectively. In various embodiments, the gaze direction determiner 230 determines the gaze direction for a front seat occupant of the vehicle 10 based on the eye gaze tracking data associated with the front seat occupant. In various embodiments, the gaze direction determiner 230 determines the gaze direction for a passenger of the vehicle 10 based on the eye gaze tracking data associated with the passenger. In various embodiments, the gaze direction determiner 230 determines the gaze direction for one or more of a driver, a co-driver, a front seat occupant and a passenger of the vehicle 10.

At 409, the gaze direction determiner 230 transmits the gaze direction of the one or more occupants to the light zone identifier 232. The method 400 returns to 404 and updates the gaze direction of the one or more occupants of the vehicle 10 on a periodic basis. In various embodiments, the method 400 ends at 416 when the vehicle 10 is turned off. In various embodiments, the method 400 ends at 416 when the vehicle 10 enters a daytime light mode.

If the gaze direction determiner 230 determines that the gaze data sensor(s) 226 do not include eye gaze tracking sensor(s) at 404, the gaze direction determiner 230 receives images of head positions of one or more occupants of the vehicle 10 from the gaze data sensor(s) 226 at 410. In various embodiments, the gaze direction determiner 230 receives images of head positions of a driver of the vehicle 10. In various embodiments, the gaze direction determiner 230 receives images of head positions of a co-driver of the vehicle 10. In various embodiments, the gaze direction determiner 230 receives images of head positions of a driver and a co-driver. In various embodiments, the gaze direction determiner 230 receives images of head positions of a front seat occupant. In various embodiments, the gaze direction determiner 230 receives images of head positions of a passenger. In various embodiments, the gaze direction determiner 230 receives images of head positions of one or more of a driver, a co-driver, a front seat occupant, and a passenger.

At 412, the gaze direction determiner 230 determines a vector of movement of head position associated with each of the one or more occupants of the vehicle 10 based on the images of the head positions of the occupant. In various embodiments, the gaze direction determiner 230 determines a vector of movement of head position of a driver of the vehicle 10 based on images of head positions of the driver. In various embodiments, the gaze direction determiner 230 determines a vector of movement of head position of a co-driver of the vehicle 10 based on images of head positions of the co-driver. In various embodiments, the gaze direction determiner 230 determines a vector of movement of head position of a driver and a co-driver of the vehicle 10 based on images of head positions of the driver and the co-driver, respectively. In various embodiments, the gaze direction determiner 230 determines a vector of movement of head position of a front seat occupant of the vehicle 10 based on images of head positions of the front seat occupant of the vehicle 10. In various embodiments, the gaze direction determiner 230 determines a vector of movement of head position of a passenger of the vehicle 10 based on images of head positions of the passenger of the vehicle 10. In various embodiments, the gaze direction determiner 230 determines a vector of movement of head position of one or more of a driver, a co-driver, a front seat occupant, and a passenger.

At 414, the gaze direction determiner 230 determines a gaze direction of the one or more occupants of the vehicle 10 based on the vector of movement of head position of the one or more occupants. In various embodiments, the gaze direction determiner 230 determines a gaze direction of a driver of a vehicle 10 based on the vector of movement of head position of the driver. In various embodiments, the gaze direction determiner 230 determines a gaze direction of a co-driver of a vehicle 10 based on the vector of movement of head position of the co-driver. In various embodiments, the gaze direction determiner 230 determines a gaze direction of a driver and a co-driver of a vehicle 10 based on the vector of movement of head position of the driver and the co-driver, respectively. In various embodiments, gaze direction determiner 230 determines a gaze direction of a front seat occupant of a vehicle 10 based on the vector of movement of head position of the front seat occupant. In various embodiments, gaze direction determiner 230 determines a gaze direction of a passenger of a vehicle 10 based on the vector of movement of head position of the passenger. In various embodiments, gaze direction determiner 230 determines a gaze direction of one or more of a driver, a co-driver, a front seat occupant, and a passenger.

At 409, the gaze direction determiner 230 transmits the gaze direction of the one or more occupants to the light zone identifier 232. The method 400 returns to 404 and updates the gaze direction of the one or more occupants of the vehicle 10 on a periodic basis. In various embodiments, the method 400 ends at 416 when the vehicle 10 is turned off. In various embodiments, the method 400 ends at 416 when the vehicle 10 enters a daytime light mode.

Referring back to FIG. 2, the light zone identifier 232 is configured to identify the light zones from the plurality of light zones 206, 208, 210, 212, 214, 216, 218, 220, 222 associated with the gaze direction of the one or more occupants of the vehicle 10. In at least one embodiment, the interior of the vehicle 10 is defined by an (x, y, x) coordinate system. The location of each of the plurality of light zones 206, 208, 210, 212, 214, 216, 218, 220, 222 in the vehicle 10 is defined by coordinates of the (x, y, z) coordinate system. The light zone identifier 232 is configured to define the gaze direction of the one or more occupants of the vehicle 10 in terms of the (x, y, z) coordinate system. The light zone identifier 232 is configured to identify the light zone associated with the gaze direction of the one or more occupants of the vehicle 10 based on a correspondence between the (x, y, z) coordinates of the gaze direction of the occupant and the (x, y, z) coordinates of a light zone. Examples of the one or more occupants include one or more of a driver, a co-driver, a front seat occupant, and a passenger.

The light zone illumination manager 234 is configured to receive the gaze direction of the one or more occupants of the vehicle 10 and the light zone(s) identified as being associated with the gaze direction of the one or more occupants. Each of the light zones includes one or more interior lights. The light zone illumination manager 234 is configured to increase the illumination intensity level of the interior light(s) in the identified light zone(s) from the minimum illumination intensity level to an increased illumination intensity level. In various embodiments, the light zone illumination manager 234 is configured to increase the illumination intensity level of the interior light(s) in the identified light zone(s) from the minimum illumination intensity level to an increased illumination intensity level gradually over a calibratable period of time. In certain embodiments, the light zone illumination manager 234 is configured to prioritize increasing the illumination intensity level of the interior light(s) in an identified light zone associated with a gaze direction of a driver over the other occupants of the vehicle 10.

The light zone illumination manager 234 is configured to periodically receive updated gaze directions of the one or more occupants of the vehicle 10 and the updated light zone(s) identified as being associated with the updated gaze direction of each of the one or more occupants. When the light zone illumination manager 234 receives an updated gaze direction for an occupant that moves away from the light zone associated with the previous gaze direction of that occupant, the light zone illumination manager 234 is configured to maintain the increased illumination intensity level of the interior light(s) in the light zone for a pre-determined period of time following the change in the gaze direction of the occupant. In various embodiments, the light zone illumination manager 234 is configured to gradually decrease the illumination intensity level of the interior light(s) in the light zone from the increased illumination intensity level to the minimum illumination intensity level for that light zone after a pre-defined period of time following the change in the gaze direction of the occupant. In various embodiments, the light zone illumination manager 234 is configured to gradually decrease the illumination intensity level of the interior light(s) in the light zone from the increased illumination intensity level to the minimum illumination intensity level over a calibratable period of time for that light zone after a pre-defined period of time following the change in the gaze direction of the occupant.

Reducing the minimum illumination intensity level of the interior lights in the light zone back to the minimum illumination intensity levels when the gaze of an occupant of the vehicle 10 is no longer directed to the light zone may decrease eye strain on the driver, co-driver, front seat occupants and/or passengers. This may enable the driver and/or co-driver to see better at night and reduce the likelihood of potential collisions. In addition, placing the interior lights in light zone back to the minimum illumination intensity levels may also reduce power consumption and increase the lifespan of the light emitting diodes (LED) used by the interior lights in the light zones. The automated nature of the management of the illumination intensity levels of the interior lights in the vehicle 10 may remove the need for a display dimmer wheel in the vehicle 10 and may result in hardware cost savings. Reducing the illumination of the interior lights in the light zones to minimum illumination intensity levels may reduce energy consumption thereby improving a range of an electric vehicle (EV).

Figure 5:
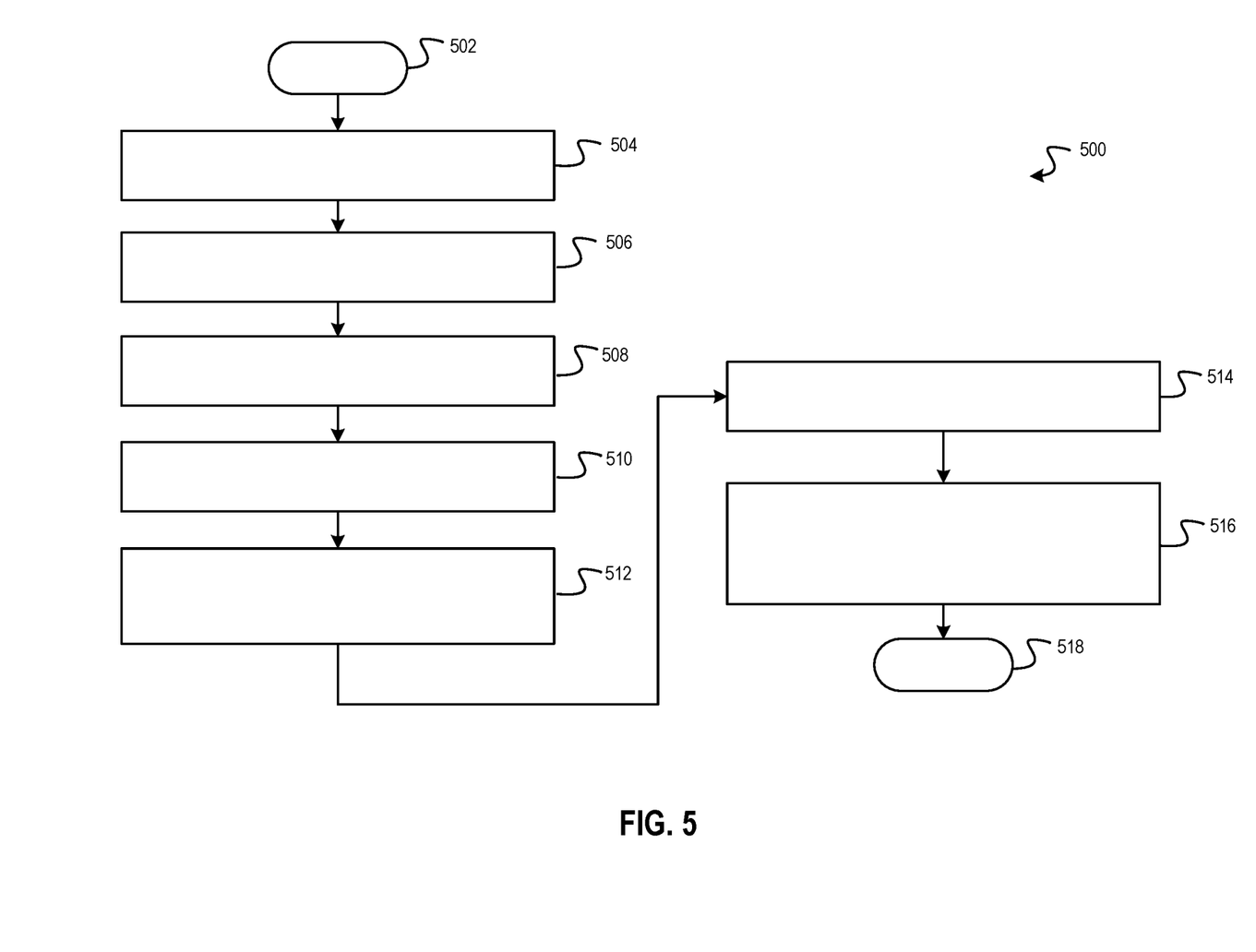
FIG. 5 is a flowchart representation of a method of managing interior light illumination in a vehicle in accordance with at least one embodiment.

Referring to FIG. 5, a flowchart representation of a method 500 of managing interior light illumination in a vehicle 10 in accordance with at least one embodiment is shown. The method 500 will be described with reference to an exemplary implementation of the interior light illumination management system 100. As can be appreciated in light of the disclosure, the order of operation within the method 500 is not limited to the sequential execution as illustrated in FIG. but may be performed in one or more varying orders as applicable and in accordance with the present disclosure.

The method begins at 502. In various embodiments, the method 500 begins when the vehicle 10 is turned on. In various embodiments, the method 500 begins when the vehicle 10 exits a daytime light mode. At 504, the interior light illumination management system 100 determines and sets the minimum illumination intensity level for each of a plurality of light zones 206, 208, 210, 212, 214, 216, 218, 220, 222 in the vehicle 10.

At 506, the interior light illumination management system 100 receives gaze data associated with one of more occupants of the vehicle 10 from gaze data sensor(s) 226. At 508, the interior light illumination management system 100 determines a gaze direction for each of the one or more occupants based on the on the gaze data associated with the occupant. At 510, the interior light illumination management system 100 identifies a light zone associated with the gaze direction of each of the one or more occupants. At 512, the interior light illumination management system 100 increases the illumination intensity level of the interior lights in the identified light zone(s) from the minimum illumination intensity level to an increased illumination intensity level.

At 514, the interior light illumination management system 100 detects a change in the gaze direction of an occupant of the vehicle 10. At 516, the interior light illumination management system 100 gradually decreases the illumination intensity level of the interior lights in the light zone from the increased illumination intensity level to the minimum illumination intensity level following a pre-determined period of time. The method 500 ends at 518. In various embodiments, the method 500 ends when the vehicle 10 is turned off. In various embodiments, the method 500 ends when the vehicle 10 enters daytime light mode.

Figure 6:
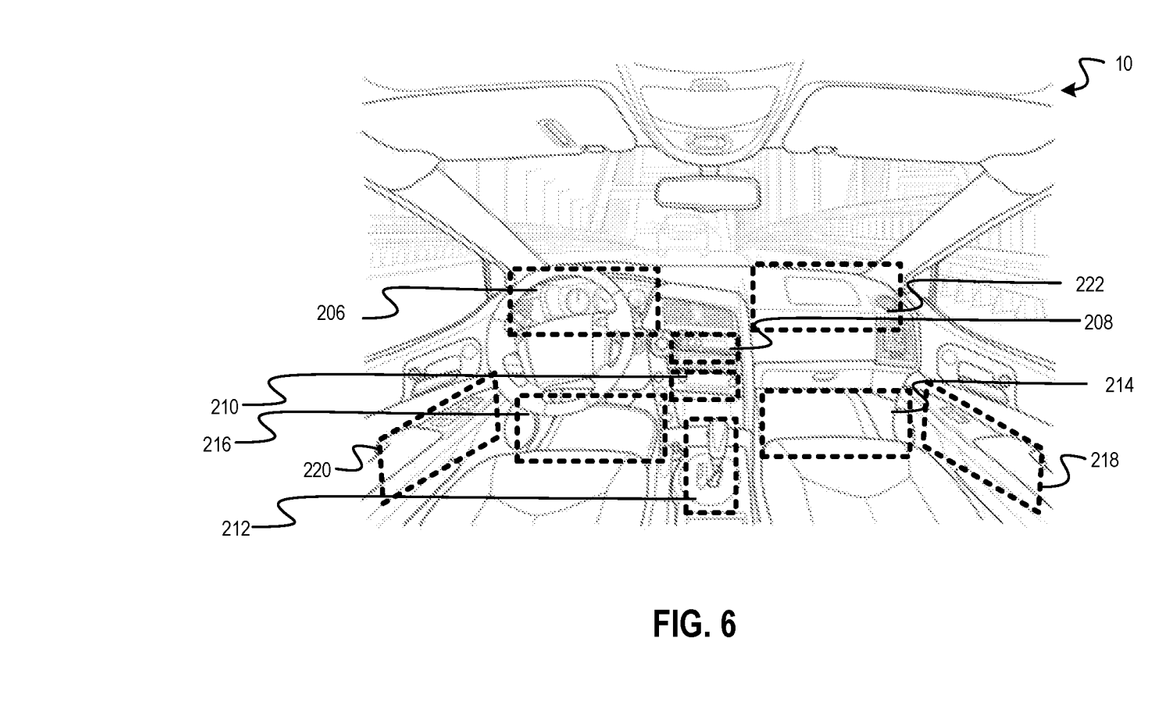
FIG. 6 is an exemplary representation of an interior of a vehicle including a plurality of light zones in accordance with at least one embodiment.

Referring to FIG. 6, an exemplary representation of an interior of a vehicle 10 including a plurality of light zones 206, 208, 210, 212, 214, 216, 218, 220, 222 in accordance with at least one embodiment is shown. In the illustrated example, the plurality of light zones 206, 208, 210, 212, 214, 216, 218, 220, 222 include an instrument cluster light zone 206, a radio light zone 208, a HVAC light zone 210, a PRNDL light zone 212, a right footwell light zone 214, a left footwell light zone 216, a right door light zone 218, a left door light zone 220, and a passenger screen light zone 222.

Figure 7:
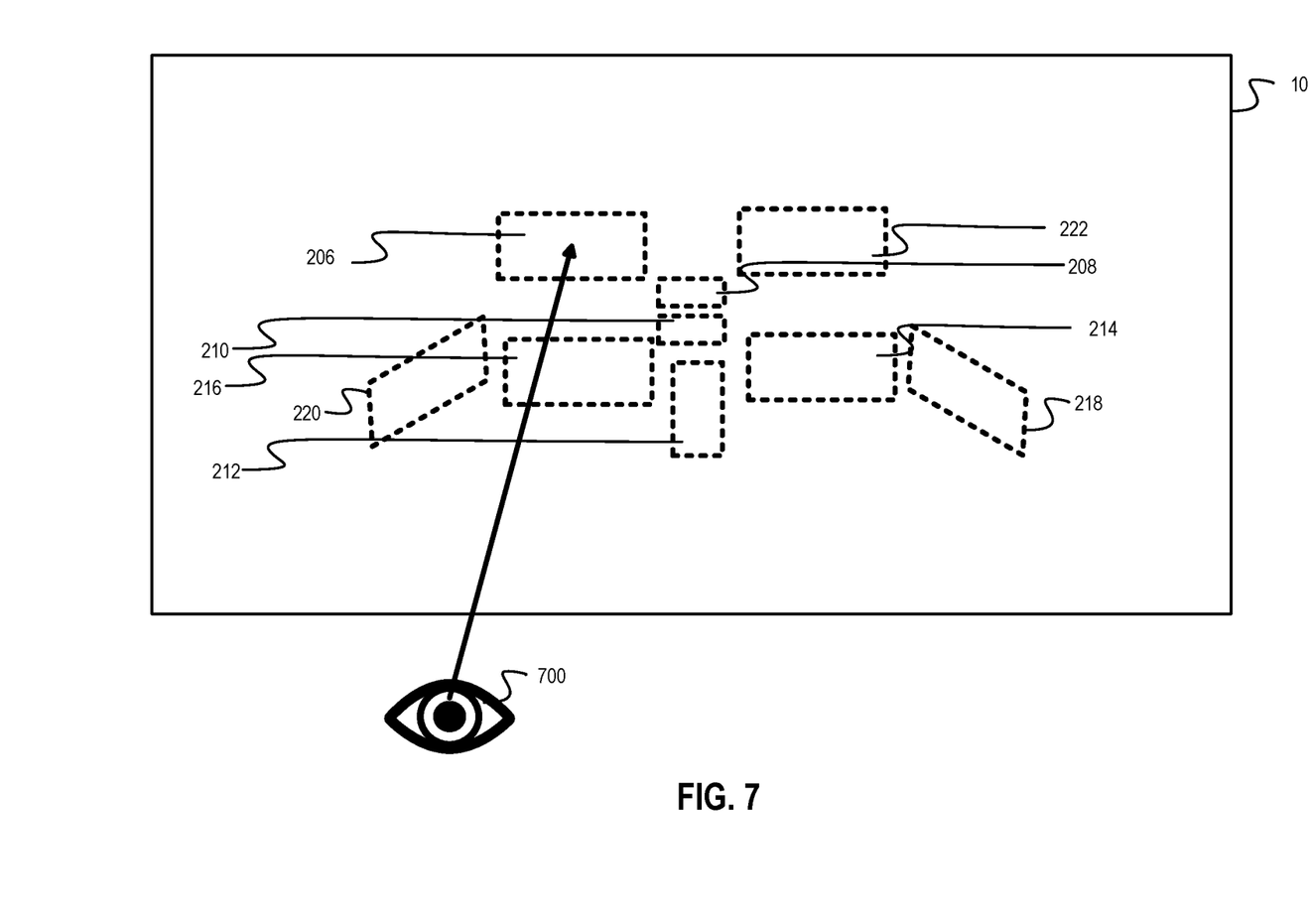
FIG. 7 is an exemplary representation of the plurality of light zones of FIG. 6 with respect to a gaze direction of an occupant of the vehicle in accordance with at least one embodiment.

Referring to FIG. 7, an exemplary representation of the plurality of light zones 206, 208, 210, 212, 214, 216, 218, 220, 222 of FIG. 6 with respect to a gaze direction 700 of an occupant of the vehicle 10 in accordance with at least one embodiment is shown. Examples of occupants include a driver, a co-driver, a front seat occupant, and a passenger. In the example, the interior light illumination management system 100 received gaze data associated with the occupant of the vehicle 10 from one or more gaze data sensor(s) 226. The interior light illumination management system 100 determined a gaze direction 700 for the occupant based on the gaze data. The interior light illumination management system 100 identified the instrument cluster light zone 206 as being in a line of sight of the occupant based on the gaze direction 700 of the occupant.

The interior light illumination management system 100 increased the illumination intensity level of the interior lights in the instrument cluster light zone 206 from a first illumination intensity level to a second illumination intensity level. In various embodiments, the interior light illumination management system 100 increased the illumination intensity level of the interior lights in the instrument cluster light zone 206 from a first illumination intensity level to a second illumination intensity level gradually over a calibratable period of time. The first illumination intensity level is the minimum illumination intensity level, and the second illumination intensity level is the increased illumination intensity level. The second illumination intensity level (also referred to as the increased illumination intensity level) is greater than the first illumination intensity level (also referred to as the minimum illumination intensity level).

The interior light illumination management system 100 will maintain the second illumination level of the interior lights in the instrument cluster light zone 206 until a pre-determined period of time elapses following detection of a change in the gaze direction of the occupant away from the instrument cluster light zone 206. Upon the detection of the change in the gaze direction, the interior light illumination management system 100 will gradually decrease the illumination intensity level of the interior lights in the instrument cluster light zone 206 from the second illumination intensity level to the first illumination intensity level after a pre-determined period of time following the detection of a change in the gaze direction of the occupant over a calibratable period of time.

The use of various embodiments of the interior light illumination management system 100 in a vehicle 10 where the interior lights in a light zone are increased from a minimum illumination intensity level to an increased illumination intensity level only when an occupant of the vehicle looks at the light zone area and adjusting the minimum illumination intensity levels based on the ambient light around the vehicle 10 may decrease eye strain on a driver, a co-driver, a front seat occupant and/or passenger. This may enable the driver and/or co-driver to see better at night and reduce the likelihood of potential collisions. In addition, the use of the interior light illumination management system 100 may reduce power consumption and increase the lifespan of the light emitting diodes (LED) used by the interior lights in the light zones. The automated nature of the management of the illumination intensity levels of the interior lights in the vehicle 10 may remove the need for a display dimmer wheel in the vehicle 10 and may result in hardware cost savings. Reducing the illumination of the interior lights in the light zones to minimum illumination intensity levels may reduce energy consumption thereby improving a range of an electric vehicle (EV).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for managing interior light illumination in a vehicle comprising:
   a processor; and
   a memory communicatively coupled to the processor, the memory comprising instructions that upon execution by the processor, cause the processor to:
   receive gaze data associated with an occupant of the vehicle from at least one gaze data sensor of the vehicle;
   determine a gaze direction of the occupant based on the gaze data;
   identify a first light zone from a plurality of light zones in the vehicle in a line of sight associated with the gaze direction of the occupant, each of the plurality of light zones including at least one interior light;
   adjust an illumination intensity level of the at least one interior light in the first light zone from a first illumination intensity level to a second illumination intensity level, the second illumination intensity level being greater than the first illumination intensity level;
   maintain the second illumination intensity level of the at least one interior light in the first light zone for a pre-determined period of time following detection of a change in the gaze direction of the occupant; and
   gradually decrease the illumination intensity level of the at least one interior light in the first light zone from the second illumination intensity level to the first illumination intensity level after the pre-determined period of time following the detection of the change in the gaze direction of the occupant.

2. The system of claim 1, wherein the memory comprises further instructions that upon execution by the processor, cause the processor to receive the gaze data associated with the occupant from the at least one gaze data sensor, the gaze data comprising eye gaze tracking data associated with the occupant.

3. The system of claim 2, wherein the memory comprises further instructions that upon execution by the processor, cause the processor to receive the eye gaze tracking data from the at least one gaze data sensor, the at least one gaze data sensor comprising at least one of a driver monitoring system (DMS), an interior vehicle camera (IVC), an interior cabin sensing radar (ICSR), a radar sensor, a shortwave infrared (SWIR) sensor, a longwave infrared sensor (LWIR), a red, green, and blue (RGB) sensor, and a thermal sensor.

4. The system of claim 1, wherein the memory comprises further instructions that upon execution by the processor, cause the processor to:
- receive the gaze data associated with the occupant from the at least one gaze data sensor, wherein the at least one gaze data sensor comprises at least one camera and the gaze data comprises images of head positions of the occupant received from the at least one camera;
- determine a vector of movement associated with a head of the occupant based on the images of the head positions; and
- determine the gaze direction of the occupant based on the vector of movement associated with the head of the occupant.

5. The system of claim 1, wherein the memory comprises further instructions that upon execution by the processor, cause the processor to receive the gaze data associated with the occupant of the vehicle, the occupant of the vehicle being at least one of a front seat occupant, a driver, a co-driver, and a passenger.

6. The system of claim 1 wherein the memory comprises further instructions that upon execution by the processor, cause the processor to identify the first light zone from the plurality of light zones, the plurality of light zones comprising at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

7. The system of claim 1 wherein the memory comprises further instructions that upon execution by the processor, cause the processor to place the at least one interior light in the first light zone in an off position, the off position being the first illumination intensity level for the first light zone.

8. The system of claim 1 wherein the memory comprises further instructions that upon execution by the processor, cause the processor to:
- receive an ambient light level around the vehicle from at least one ambient light sensor;
- determine the first illumination intensity level for the first light zone based on the ambient light level; and
- illuminate the at least one interior light in the first light zone in accordance with the first illumination intensity level.

9. The system of claim 1, wherein the memory comprises further instructions that upon execution by the processor, cause the processor to:
- determine the first illumination intensity level for the first light zone based on safety regulations; and
- illuminate the at least one interior light in the first light zone in accordance with the first illumination intensity level.

10. A method for managing interior light illumination in a vehicle comprising:
- receiving gaze data associated with an occupant of the vehicle from at least one gaze data sensor of the vehicle;
- determining a gaze direction of the occupant based on the gaze data;
- identifying a first light zone from a plurality of light zones in the vehicle in a line of sight associated with the gaze direction of the occupant, each of the plurality of light zones including at least one interior light; and
- adjusting an illumination intensity level of the at least one interior light in the first light zone from a first illumination intensity level to a second illumination intensity level, the second illumination intensity level being greater than the first illumination intensity level;
- maintaining the second illumination intensity level of the at least one interior light in the first light zone for a pre-determined period of time following detection of a change in the gaze direction of the occupant; and
- gradually decreasing the illumination intensity level of the at least one interior light in the first light zone from the second illumination intensity level to the first illumination intensity level after the pre-determined period of time following the detection of the change in the gaze direction of the occupant.

11. The method of claim 10, further comprising receiving the gaze data associated with the occupant from the at least one gaze data sensor, wherein the at least one gaze data sensor comprises at least one of a driver monitoring system (DMS), an interior vehicle camera (IVC), an interior cabin sensing radar (ICSR), a radar sensor, a shortwave infrared (SWIR) sensor, a longwave infrared sensor (LWIR), a red, green, and blue (RGB) sensor, and a thermal sensor and the gaze data comprises eye gaze tracking data associated with the occupant.

12. The method of claim 10, further comprising identifying the first light zone from the plurality of light zones, the plurality of light zones comprising at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

13. The method of claim 10, further comprising:
- receiving an ambient light level around the vehicle from at least one ambient light sensor;
- determining the first illumination intensity level for the first light zone based on the ambient light level; and
- illuminating the at least one interior light in the first light zone in accordance with the first illumination intensity level.

14. A vehicle including a system for managing interior light illumination comprising:
- a processor; and
- a memory communicatively coupled to the processor, the memory comprising instructions that upon execution by the processor, cause the processor to:
  - receive gaze data associated with an occupant of the vehicle from at least one gaze data sensor of the vehicle;
  - determine a gaze direction of the occupant based on the gaze data;
  - identify a first light zone from a plurality of light zones in the vehicle in a line of sight associated with the gaze direction of the occupant, each of the plurality of light zones including at least one interior light;
  - adjust an illumination intensity level of the at least one interior light in the first light zone from a first illumination intensity level to a second illumination intensity level, the second illumination intensity level being greater than the first illumination intensity level;

maintain the second illumination intensity level of the at least one interior light in the first light zone for a pre-determined period of time following detection of a change in the gaze direction of the occupant; and gradually decrease the illumination intensity level of the at least one interior light in the first light zone from the second illumination intensity level to the first illumination intensity level after the pre-determined period of time following detection of the change in the gaze direction of the occupant.

15. The vehicle of claim 14, wherein the memory comprises further instructions that upon execution by the processor, cause the processor to receive the gaze data associated with the occupant from the at least one gaze data sensor, wherein the at least one gaze data sensor comprises at least one of a driver monitoring system (DMS), an interior vehicle camera (IVC), an interior cabin sensing radar (ICSR), a radar sensor, a shortwave infrared (SWIR) sensor, a longwave infrared sensor (LWIR), a red, green, and blue (RGB) sensor, and a thermal sensor and the gaze data comprises eye gaze tracking data associated with the occupant.

16. The vehicle of claim 14, wherein the memory comprises further instructions that upon execution by the processor, cause the processor to identify the first light zone from the plurality of light zones, the plurality of light zones comprising at least one of an instrument cluster light zone, a radio light zone, a heating ventilation air conditioning (HVAC) light zone, a park-reverse-neutral-drive-low (PRNDL) light zone, a right footwell light zone, a left footwell light zone, a right door light zone, a left door light zone, and a passenger screen light zone.

17. The vehicle of claim 14, wherein the memory comprises further instructions that upon execution by the processor, cause the processor to receive the gaze data associated with the occupant from the at least one gaze data sensor, the gaze data comprising eye gaze tracking data associated with the occupant.

18. The vehicle of claim 14, wherein the memory comprises further instructions that upon execution by the processor, cause the processor to:

receive the gaze data associated with the occupant from the at least one gaze data sensor, wherein the at least one gaze data sensor comprises at least one camera and the gaze data comprises images of head positions of the occupant received from the at least one camera;

determine a vector of movement associated with a head of the occupant based on the images of the head positions; and determine the gaze direction of the occupant based on the vector of movement associated with the head of the occupant.

19. The vehicle of claim 14, wherein the memory comprises further instructions that upon execution by the processor, cause the processor to receive the gaze data associated with the occupant of the vehicle, the occupant of the vehicle being at least one of a front seat occupant, a driver, a co-driver, and a passenger.

20. The vehicle of claim 14, wherein the memory comprises further instructions that upon execution by the processor, cause the processor to:

receive an ambient light level around the vehicle from at least one ambient light sensor;

determine the first illumination intensity level for the first light zone based on the ambient light level; and illuminate the at least one interior light in the first light zone in accordance with the first illumination intensity level.

* * * * *